Dec. 5, 1939.   F. J. G. HENRY   2,182,049
HYDRAULIC CLUTCH AND POWER TRANSMISSION DEVICE
Filed July 17, 1936   3 Sheets-Sheet 1

Inventor
Francois J. G. Henry
By Browne & Phelps
Attorneys

Dec. 5, 1939.　　　F. J. G. HENRY　　　2,182,049
HYDRAULIC CLUTCH AND POWER TRANSMISSION DEVICE
Filed July 17, 1936　　　3 Sheets-Sheet 2

Inventor
Francois J. G. Henry
By Browne & Phelps
Attorneys

Dec. 5, 1939.  F. J. G. HENRY  2,182,049
HYDRAULIC CLUTCH AND POWER TRANSMISSION DEVICE
Filed July 17, 1936   3 Sheets-Sheet 3

Inventor
François J. G. Henry
By Browne & Phelps
Attorneys

Patented Dec. 5, 1939

2,182,049

UNITED STATES PATENT OFFICE 2,182,049

HYDRAULIC CLUTCH AND POWER TRANSMISSION DEVICE

Francois Joseph Georges Henry, Saint Loup, France

Application July 17, 1936, Serial No. 91,240
In France July 23, 1935

15 Claims. (Cl. 192—58)

The present invention relates to hydraulic clutch and power transmission devices, and, more especially, to apparatus of this kind including two wheels, one of which works as a pump wheel and the other as a turbine wheel, between which there is supplied a liquid which serves to transmit the drive from one wheel to the other.

The object of the present invention is to provide a device of this kind which is both strong and efficient and which permits of obtaining a coupling which is effective while being smooth and gradual, and a quick and full disconnection, while ensuring a regular drive during working.

Another object of the present invention is to provide a device of the kind above referred to which does not heat up as it is frequently the case with hydraulic transmissions, when the two wheels are not turning at the same speed, a possible occurrence especially when the speed of revolution is changing.

An essential feature of the present invention consists in making use of the rotation of the outer casing of the pump wheel for driving the liquid driven out, at the time of the disengagement of the clutch, from the space between the two wheels, and reintroducing it into the space between the two wheels, after having eventually collected it in a suitable reservoir especially provided for this purpose.

Another feature of the present invention consists in providing means, operative even when the clutch is working in the engaged position, for continuously renewing the liquid working in the apparatus, the liquid that is evacuated being cooled down in any suitable manner, before being reintroduced into the apparatus.

Still another feature of the present invention consists in giving the vanes of the centrifugal pump wheel a shape such that the vanes of the turbine wheel are nearly wholly surrounded by the vanes of the pump wheel.

Other characteristics of the present invention will result from the following detailed description of a specific embodiment thereof.

A preferred embodiment of the present invention will be hereinafter described, with reference to the accompanying drawings, given merely by way of example, and in which:

Fig. 3 illustrates the circulation of the liquid penetrating between the two wheels of the apparatus;

Fig. 4 shows the clutch device in the state of rest;

Fig. 5 shows the clutch device in the engaged position;

Fig. 6 shows the clutch device in the disengaged position, the driving shaft being running.

Figure 1:
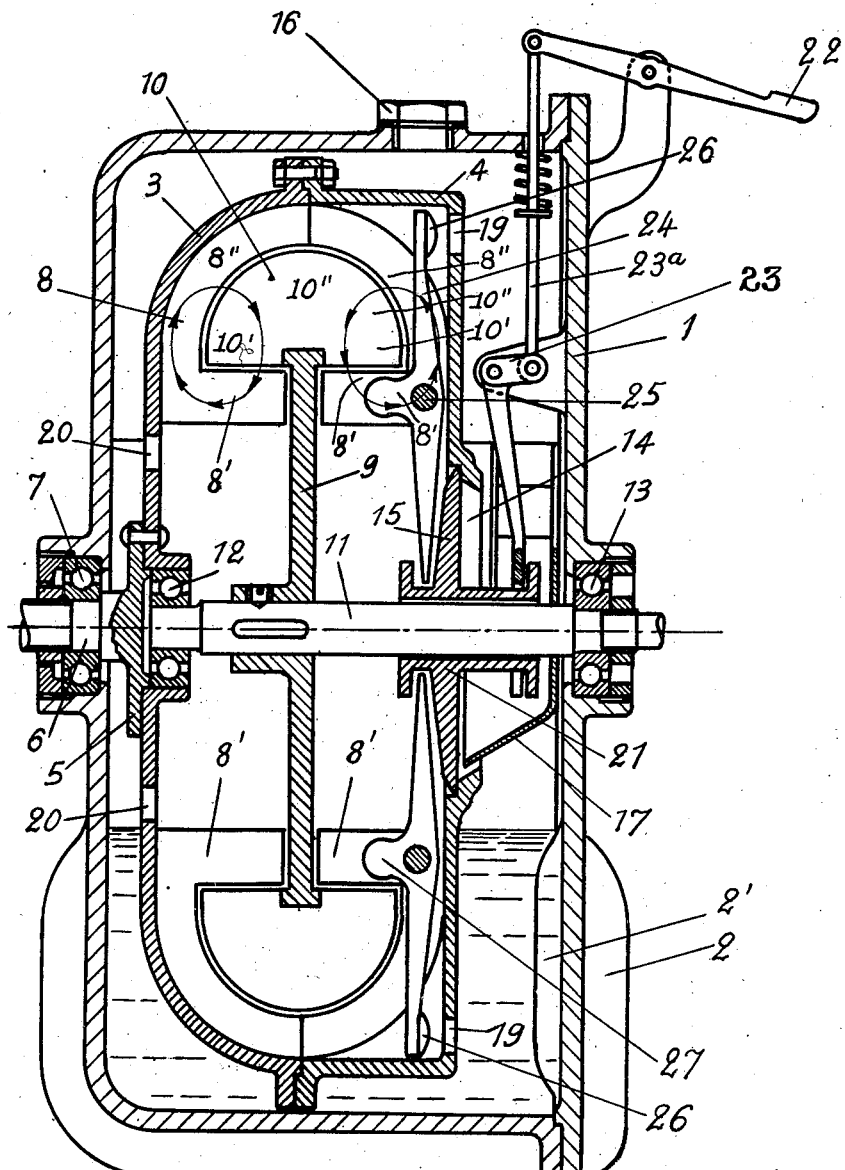
Fig. 1 is a vertical sectional view of a hydraulic clutch and power transmission device according to the present invention.
Figure 2:
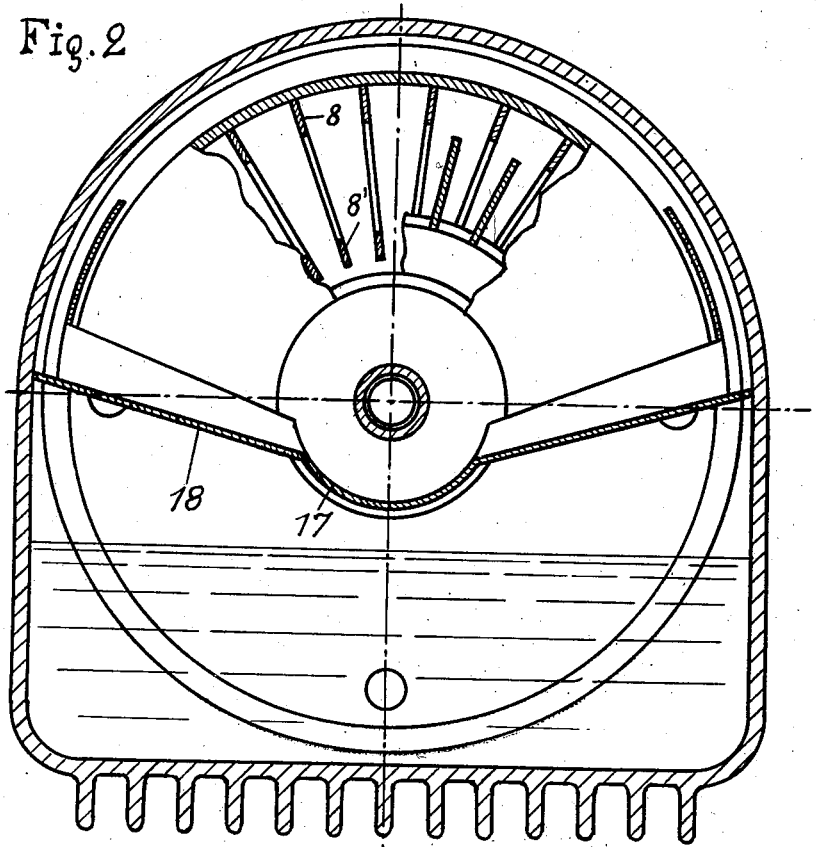
Fig. 2 is a front elevational sectional view of the same apparatus, on a somewhat smaller scale.

In the various figures of the drawings, reference character 1 designates the external casing of the device, which also constitutes the reservoir containing the liquid the introduction of which between the two wheels will cause one of these wheels to be driven by the other. This casing is provided, on the inside and on the outside, with cooling fins 2, 2'. An orifice provided with a plug 16 permits of introducing the necessary amount of liquid into said casing.

In the interior of the fixed case is disposed another case, such inner case carrying the elements constituting the pump wheel and the turbine wheel of the system.

The turning case is in two parts 3 and 4 of stamped metal fixed to each other in such manner as to constitute a kind of flat cylindrical drum, fixed through one of its faces, in its central portion, to a plate 5 carried by the driving shaft 6. The latter is journalled in casing 1 through a ball bearing 7.

In the interior of said case is disposed a turning disc 9 mounted on a shaft 11 which turns during the rolling on balls 12 and 13.

In the interior of the case 3, 4 are disposed the blades or vanes 8, 8' and on the disc 9 are similarly disposed the vanes 10, the combination of these several vanes constitute the system of the pump wheel and the turbine wheel. The vanes 8, 8', as shown on the drawings, enclose in a half circle the side edges of the vanes 10 which are carried by the disc 9.

According to the present invention, the vanes 8 of the pump wheel are provided with surfaces 8' which surround the vanes 10 of the turbine wheel in such manner as to extend around practically the whole of the periphery thereof.

The assembly thus constituted provides a symmetric space divided at its median part by the disc 9, and through the space, also occupied by the assembled vanes, the liquid can circulate freely, without suffering any restraint by any partition situated on a plane perpendicular to the vanes.

From experience it can be stated that there are also formed two moving rings of liquid during the commencement of gliding between the pump and the turbine, which rings are represented by the circular arrows of Figure 1. These rings of liquid are not at all guided and as a consequence they close up in a perfectly free and natural manner. It will thus be seen that the application is composed of a centrifugal pump consisting of a system of vanes 8, and, on the other hand, of a centripetal turbine consisting of the system of vanes 10, one being the distributor for the other and vice versa.

The fluid travels first in the cycle while being displaced from the interior towards the exterior along the vanes 8, 8'; it then enters along vanes 10 of the turbine at the joint 8''—10'' and leaves at the joint 10'—8'.

Experience indeed taught that this arrangement permits of obtaining a considerably improved drive of one of the wheels by the other.

Turbine 9 is keyed on a shaft 11 carried by ball bearings 12, 13, one of which is carried by the pump wheel 3—4 and the other by casing 1.

The rear part 4 of the drum which forms the pump wheel 3—4 is provided with a circular orifice 14 adapted to be stopped by a plate or disc 15, as it will be hereinafter explained. This orifice serves for inflow into the casing 3—4, of the liquid fed through a system 17—18 including a kind of nozzle 17 and radial troughs 18 adapted to collect the liquid which, as it will be hereinafter explained, is driven to the upper part of casing 1.

On the other hand, the part 4 of drum 3—4 is provided, around its periphery, with a plurality of orifices 19 through which the liquid escapes when the clutch is disengaged, whereas other holes 20 are provided, according to the invention, in the portion 3 of the drum. The function of these last mentioned holes will be hereinafter explained.

The plate or disc 15 which serves to stop orifice 14 is mounted on a sleeve 21 capable of sliding along shaft 11. The sliding movement of this sleeve is controlled by a pedal 22, through a system including a bell crank lever 23 and a link 23a interposed between said lever and pedal 22. On the other hand, the sliding movement of sleeve 21 produces a pivoting movement of a plurality of levers 24 pivoted at 25 to brackets carried by portion 4 of drum 3—4. These levers are fitted, at their outer ends, with valve elements 26 adapted to stop orifices 19. Small masses 27 carried by levers 24 tend, when the apparatus is rotating, to pivot said levers under the effect of the centrifugal force, in such manner as to apply valve elements 26 against holes 19.

I will now explain the operation of the device above described.

Figure 4:
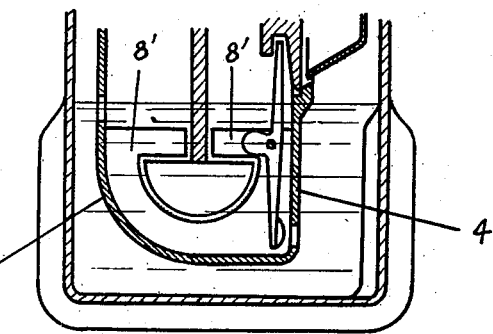
Figure 6:
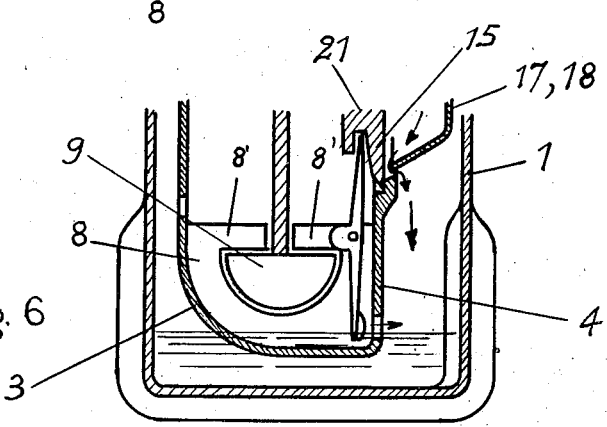

In the state of rest, the apparatus is filled with liquid, for instance oil, up to the level indicated by Fig. 4. Of course, this liquid is also present in the lower part of drum 3—4. If, now, the engine is started, with the device in the disengaged position, as shown by Fig. 6, the liquid that was present in drum 3—4, driven by the vanes 8 of the pump wheel, is driven out, under the action of the centrifugal force, to the outside of drum 3—4 through orifices 19, which are not stopped by valves 26.

Figure 3:
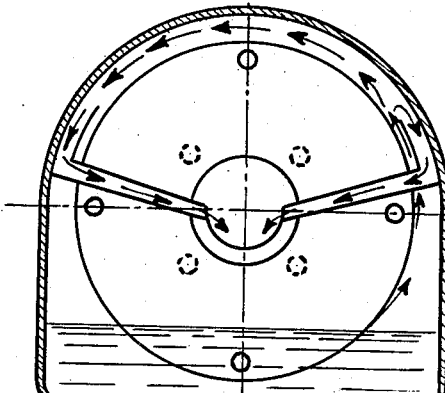
Figs. 3, 4, 5 and 6 are explanatory diagrammatical views illustrating interesting features of the working of the apparatus.

At the same time, as drum 3—4 is partly immersed in the liquid present in the lower part of casing 1, a sheet of said liquid is driven along by said drum, by adhesion to the peripheral outer surface thereof. This sheet of liquid is then projected, through the action of the centrifugal force, onto the inner wall of casing 1, over the upper part thereof. This liquid runs down along said wall and a part thereof is caught by troughs 18, which extend radially as far as the inner wall of casing 1, and conveyed, by gravity, to the central collecting trough 17. The flow of the liquid thus fed from the bottom of casing 1 to the trough system 17—18 is diagrammatically illustrated by the arrows of Fig. 3. But as plate 15 fully stops orifice 14, this liquid cannot enter into drum 3—4. As there exists a clearance between the lower edge of trough 17 and the lateral face of drum 3—4, the liquid fed to said trough 17 flows back to the lower part of casing 1, the flow of the liquid being indicated by the arrows of Fig. 6.

Figure 5:
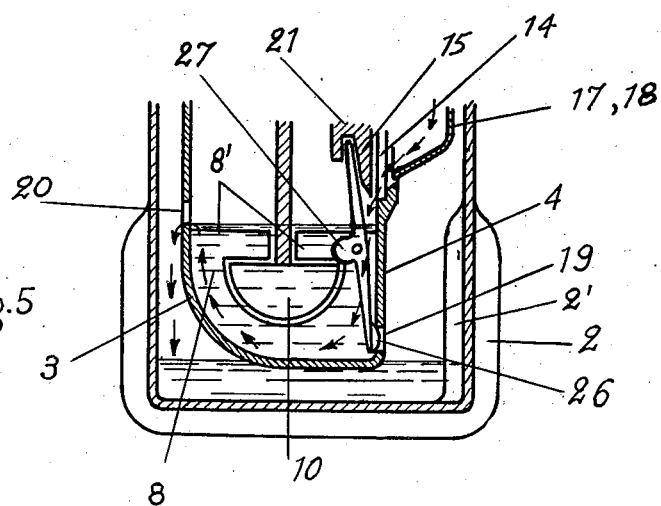

If, now, the clutch pedal 22 is released, which causes sleeve 21 to slide along shaft 11, disc 15 now opens orifice 14. At the same time, levers 24 are released and they swing in the clockwise direction under the effect of the centrifugal force acting on small masses 27. Valve elements 26 now stop orifices 19. The liquid present in gutter-shaped system 17—18 enters drum 3—4 and cannot escape through orifices 19, which are now closed. Under the effect of the centrifugal force, this liquid is distributed in the form of an annular sheet along the inner wall of said drum, until it reaches orifices 20 (Fig. 5), the overflow escaping through these orifices. But as the peripheral outer surface of drum 3—4 is still driving along liquid from the lower part of casing 1 so as to feed said liquid to the trough system 17—18, in the manner above described, fresh liquid continuously enters drum 3—4 through orifice 14, while the overflow keeps flowing out through orifices 20 and returns to the lower part of casing 1.

Now, owing in particular to the provision of cooling fins 2, 2' on the inside and the outside of said casing, the liquid present in the lower part of said casing and therefore the liquid fed to gutter-shaped system 17—18 and through said system to the inside of drum 3—4, is relatively cold liquid. When entering the drum, this cold liquid, which is denser, tends to move toward the periphery of said drum and therefore it drives out the liquid already heated up between the wheels of the system and which escapes through orifices 20. I thus obtain a continuous inflow of cold liquid to the inside of the drum, an equivalent amount of hot liquid being evacuated at the same time. Owing to this arrangement, the liquid present between the wheel elements of the system is not heated.

Concerning the operation of the clutch itself, as in all apparatus of the same kind, the liquid that has entered inside drum 3—4, driven by vanes 8, in turn drives the vanes 10 of the turbine wheel, so that, gradually, the vanes of said turbine wheel are caused to turn with an angular velocity substantially equal to that of vanes 8.

This operation of the device is obtained in a particularly efficient manner, according to the present invention, owing in particular to the provision of the surfaces 8' of vanes 8.

When it is desired to disengage the clutch, it suffices to depress pedal 22, which has for its effect on the one hand to close the liquid inlet orifice 14, and on the other hand to open orifices 20. Therefore no liquid now enters the drum through orifice 14 and the drum empties very rapidly through orifices 19. As no liquid remains between the two turbines, vanes 10 cease to be driven by vanes 8. The clutch is now disengaged.

Of course, the example above described can be modified without departing from the principle of the invention.

On the other hand, the invention is applicable to any kind of hydraulic clutch, whatever be the shape and the arrangement of the elements, adapted to cooperate together, between which the drive is transmitted through the liquid.

In particular, the shape of the vanes might be different, but preferably the vanes of the centrifugal pump wheel should be provided with surfaces projecting between the vanes of the turbine wheel and the axis of said last mentioned wheel in a manner analogous to that illustrated by the drawings, so as to improve the drive.

Concerning the clutch device considered as a whole, it can be used for the transmission of power as well in the case of stationary machines as in that of vehicles of any kind, such as automobiles and the like. When applied to an automobile vehicle, the device according to the present invention may, advantageously, be connected with an automatic disengagement device.

As for the device for controlling the engagement and the disengagement of the clutch, it may, of course, be of any kind whatever.

In a general manner, while I have, in the above description, disclosed what I deem to be a practical and efficient embodiment of the present invention, it should be well understood that I do not wish to be limited thereto as there might be changes made in the arrangement, disposition and form of the parts without departing from the principle of the present invention as comprehended within the scope of the accompanying claims.

What I claim is:

1. A hydraulic clutch and power transmission device of the type described, which comprises, in combination, a driving shaft, a driven shaft, a casing containing a liquid, a pump wheel in the form of a closed drum provided with an orifice in its central part, mounted in said casing and coupled with said driving shaft, a turbine wheel journalled in said drum and coupled with said driven shaft, and gutter shaped means carried by said casing, for directing the liquid present in the annular space between said drum and said casing and driven by the outer surface of said casing toward said orifice.

2. A hydraulic clutch and power transmission system of the type described, which comprises, in combination, a driving shaft, a driven shaft, a casing containing a liquid, a pump wheel in the form of a closed drum provided with an orifice in its central part, mounted in said casing and coupled with said driving shaft, a turbine wheel journalled in said drum and coupled with said driven shaft, gutter shaped means carried by said casing, for directing the liquid present in the annular space between said drum and said casing and driven by the outer surface of said casing toward said orifice, said drum being provided with a plurality of holes close to the periphery thereof, valve elements pivoted to said casing and adapted to close said holes under the effect of the centrifugal force, a plate slidable along the axis of said drum capable of closing said orifice, means interconnecting said plate and said valve elements for preventing the closing of said valve elements when said plate is in the closed position, and means for operating said plate 3. A hydraulic clutch and power transmission system of the type described, which comprises, in combination, a driving shaft, a driven shaft, a casing containing a liquid, a pump wheel in the form of a closed drum provided with an orifice in its axial part, mounted in said casing and coupled with said driving shaft, a turbine wheel journalled in said drum and coupled with said driven shaft, gutter-shaped means, carried by said casing, for directing the liquid present in the annular space between said drum and said casing and driven by the outer surface of said drum toward said orifice, said drum being provided with a plurality of holes close to the periphery thereof, valve elements pivoted to said casing and adapted to close said holes under the effect of the centrifugal force, a plate slidable along the axis of said drum capable of closing said orifice, means interconnecting said plate and said valve elements for preventing the closing of said valve elements as long as said plate is in the closed position, means for controlling the position of said plate, means carried by said casing for cooling the liquid present therein, said drum being provided with holes provided in the part thereof intermediate between its periphery and its axial portion, whereby the liquid in said drum is continuously renewed.

4. A hydraulic clutch and power transmission device of the type described, which comprises, in combination, a driving shaft, a driven shaft, a casing containing a liquid in the lower part thereof, a pump wheel in the form of a closed drum mounted in said casing and coupled with said driving shaft, a turbine wheel journalled in said drum and coupled with said driven shaft, said drum being provided with an orifice in the central face of one lateral face thereof, gutter-shaped means carried by said casing for directing the liquid projected by the periphery of said drum and running down along the inner wall of said casing toward said orifice, a plate movable axially for closing at will said orifice, said drum being provided with holes located close to the periphery thereof, and means operative by said closure plate and the centrifugal force for closing said holes when said plate is in the open position and opening said holes when said plate is in the closed position, said gutter shaped means being mounted with a certain clearance between the lower end thereof and said drum, whereby the liquid fed to said gutter-shaped means is allowed to return to the bottom of said casing when said closure plate is in the closed position.

5. A hydraulic clutch and power transmission device of the type described, which comprises, in combination, a driving shaft, a driven shaft, a casing containing a liquid in the lower part thereof, a pump wheel in the form of a closed drum mounted in said casing and coupled with said driving shaft, a turbine wheel journalled in said drum and coupled with said driven shaft, said drum being provided with an orifice in the central part of the lateral face thereof, with a plurality of holes in the peripheral portion of the same face and with a plurality of holes in the intermediate portion of the opposite face thereof, a closure plate movable axially opposite said orifice so as to permit of closing it, gutter-shaped means carried by said casing for directing the liquid projected by the periphery of said drum and running down along the inner periphery of said casing toward said orifice, said gutter-shaped means being mounted with a certain clearance between the lower end thereof and said drum, whereby the liquid fed to said gutter-shaped means is allowed to return to the bottom of said casing when said closure plate is in the closed position, and means, responsive to the action of the centrifugal force, carried by said drum and operatively connected with said closure plate, for closing the first mentioned holes when said plate is in the open position and opening said first mentioned holes when said plate is in the closed position.

6. A hydraulic clutch and power transmission device which comprises in combination, a rotatable casing, partially filled with a liquid and in said casing a rotatable disc, these two elements carrying interacting vanes which form a pump wheel and a turbine wheel, means for causing the liquid to flow continuously and freely in said rotatable casing and means for adjusting the level of the liquid, in said rotatable casing below a predetermined height.

7. A hydraulic clutch and power transmission device which comprises in combination, a rotatable casing, partially filled with a liquid and in said casing a rotatable disc, these two elements carrying interacting vanes which form a pump wheel and a turbine wheel, a stationary casing containing same liquid, means for causing the liquid to flow continuously in said rotatable casing, said means consisting in the rotatable casing itself of which the lower part is immerged into the liquid of the stationary casing and is adapted to cooperate with the outer surface of said casing, for causing the liquid in said stationary casing to flow continuously and freely into said rotatable casing.

8. A hydraulic clutch and power transmission device which comprises in combination, a rotatable casing, partially filled with a liquid and in said casing a rotatable disc, these two elements carrying interacting vanes which form a pump wheel and a turbine wheel, a stationary casing containing said liquid, means for causing the liquid to flow continuously in said rotatable casing, said means consisting in the rotatable casing itself of which the lower part is immerged into the liquid of the stationary casing for projecting the liquid on the upper inner part of said stationary casing, and, in combination with said stationary casing a drain for collecting and conveying the streaming liquid, within the rotatable casing.

9. A hydraulic clutch and power transmission device which comprises in combination, a rotatable casing, partially filled with a liquid and in said casing a rotatable disc, these two elements carrying interacting vanes which form a pump wheel and a turbine wheel, means for causing the liquid to flow continuously and freely in said rotatable casing, and at least on over-flow outlet for adjusting below a predetermined height the liquid flowing continuously and freely in said rotatable casing.

10. A hydraulic clutch and power transmission device which comprises in combination, a rotatable casing, partially filled with a liquid and in said casing a rotatable disc, these two elements carrying interacting vanes which form a pump wheel and a turbine wheel, means for causing the liquid to flow continuously and freely in said rotatable casing and a combination of valves of which one, for the feeding, is near the center and the other, for the discharge, near the periphery, said valves being interconnected by controlling means for simultaneously opening the center valve and closing the periphery valves and vice-versa.

11. A hydraulic clutch and power transmission device which comprises, in combination, a rotatable casing, partially filled with a liquid and in said casing a rotatable disc, these two elements carrying interacting vanes, which form a pump wheel and a turbine wheel, the blades of said wheels being plane and of greater dimensions than the self generated ring shaped streams of liquid, means for causing the liquid to flow continuously and freely in said rotatable casing and means for adjusting the level of the liquid, in said rotatable casing below a predetermined height.

12. A hydraulic clutch and power transmission device which comprises in combination, a rotatable casing, partially filled with a liquid and in said casing a rotatable disc, these two elements carrying interacting vanes which form a pump wheel and a turbine wheel, a part at least of the joints between the blades of the pump wheel and the turbine wheel being in a transverse direction to the plane of said wheels, means for causing the liquid to flow continuously and freely in said rotatable casing and means for adjusting the level of the liquid, in said rotatable casing below a predetermined height.

13. A hydraulic clutch and power system transmission device which comprises in combination, a rotatable casing, partially filled with a liquid and in said casing a rotatable disc, these two elements carrying interacting vanes which form a pump wheel and a turbine wheel, means for causing the liquid to flow continuously and freely in said rotatable casing and a combination of valves of which the one, for the feeding, is near the center and the other for the discharge near the periphery, said valves being interconnected by controlling means for simultaneously opening the center valve and closing the periphery valves and vice-versa, the discharge valves of the periphery being each mounted on a lever having a mass for applying same on their seat under the action of centrifugal stresses.

14. A hydraulic clutch and power transmission device which comprises in combination, a rotatable casing, partially filled with a liquid and in said casing a rotatable disc, these two elements carrying interacting vanes which form a pump wheel and a turbine wheel, the blades extending laterally to a supporting central disc in a symmetrical arrangement, and forming so a double pump-turbine system axially equilibrated, means for causing the liquid to flow continuously and freely in said rotatable casing and means for adjusting the level of the liquid, in said rotatable casing below a predetermined height.

15. A hydraulic clutch and power transmission device of the type described, which comprises in combination, a driving shaft, a driven shaft, a casing containing a liquid, a pump wheel in the form of a closed drum mounted in said casing and coupled with said driving shaft, a turbine wheel journalled in said drum and coupled with said driven shaft, said pump wheel carrying vanes having projections engaging between the vanes of the turbine wheel and the axis thereof so as to ensure an improved drive of the two wheels by each other, and means adapted to cooperate with the outer surface of said drum for causing the liquid in said casing to flow into said drum.

FRANCOIS JOSEPH GEORGES HENRY.